Nov. 4, 1958

J. C. OWEN ET AL 2,859,005

MONITORING SYSTEM FOR AIRCRAFT AUTO PILOTS

Filed Nov. 21, 1952

INVENTORS
JOHN C. OWEN
BY FRANK PRAPIS

Oscar B Brumback
ATTORNEY

United States Patent Office 2,859,005
Patented Nov. 4, 1958

2,859,005

MONITORING SYSTEM FOR AIRCRAFT AUTO PILOTS

John C. Owen, Palisades Park, and Frank Prapis, Paterson, N. J., assignors to Bendix Aviation Corporation, Teterboro, N. J., a corporation of Delaware Application November 21, 1952, Serial No. 321,804

10 Claims. (Cl. 244—77)

The present invention relates generally to safety or monitoring equipment and more particularly to a method and apparatus for detecting the improper functioning of an automatic control system and as such is an improvement over copending application Serial No. 122,791 filed October 21, 1949 now U. S. Patent 2,773,252 and assigned to the assignee of the present invention.

As a result of the atmospheric conditions under which aircraft are flown, together with the distances, heights and speeds which are traversed and the loads that are carried, the structures of the aircraft are subjected to sustained and at times critical aerodynamic stresses. Yet, aircraft equipped with automatic pilot systems fly safely and consistently on schedule when all components of the automatic pilot system function properly. However, in any system as complex and complicated as an automatic pilot system, failures may occur despite extreme care in designing and testing the system. An uncommon condition, such as a short circuit or other electrical or mechanical failure of the automatic pilot system, may result in a loss of service and possibly danger to the aircraft and cargo or crew before the condition is detected and corrected.

An object of the present invention, therefore, is to provide a novel apparatus for monitoring the operation of an automatic steering system.

Another object is to provide a novel apparatus for comparing the control action on an aircraft about its axes by the references of an automatic steering system with independent attitude and control references of the monitor and for stopping the steering operation of the automatic steering system when such comparison indicates differences exceeding prescribed limits.

Still another object is to provide a novel apparatus which will prevent operation of the aircraft by the automatic steering system before the aircraft will have responded appreciably to any large control action which may result from an electrical or mechanical malfunctioning of the automatic steering system.

A further object is to provide a novel monitor apparatus for preventing operation of the control surfaces of an aircraft by an automatic pilot system when the control action on a surface reaches a magnitude warranting corrective action even though such magnitude is attained slowly.

A still further object is to provide a novel means for preventing operation of the control surfaces of an aircraft by the automatic pilot system when the human pilot manually overpowers the automatic pilot system thereby eliminating the need of his reaching for additional disengaging devices.

Other objects of the present invention are to provide a novel monitor for an automatic pilot system which is self contained, and separate and independent of the automatic pilot system so that a failure of all or any portion of the automatic pilot system will not effect the operation of the monitor. In the novel monitoring system contemplated by the present invention, when the automatic pilot system is operating properly even under adverse flying conditions, the monitoring system will not render the automatic pilot system ineffective for controlling the aircraft unless improper action of the automatic pilot system occurs. Also the sensitivity of the novel monitor system is adjustable, and compensation is made for variable pitch attitudes of the craft due to loading and aerodynamic changes. Audible and visible alarms may be used for apprising the human pilot of the improper operation.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

In the accompanying drawings illustrating the invention, in the several figures of which like parts are similarly designated.

In the drawings, the novel monitoring system of the present invention is shown in operative association with an automatic pilot system for an aircraft. The automatic pilot system illustrated is generally of the type described in copending application Serial No. 516,488, filed December 31, 1943, now U. S. Patent 2,625,348 and assigned to the assignee of the present invention. The novel monitoring system, however, has general applications and is not limited to the particular automatic pilot system disclosed.

In conventional automatic pilot systems, reference sensors with associated signal developing devices develop reference signals or control effects corresponding to deviations of the aircraft from a predetermined attitude or position. Servoamplifiers amplify the signals to operate the servomotors for the control surfaces. Rate generators and follow-up devices damp the action of the control surfaces to prevent hunting and oscillation of the aircraft. The servoamplifiers, 7', 7'', 7''', servomotors 8', 8'', 8''', rate generators 9', 9'', 9''', and follow-up devices 10', 10'', 10''', are similar for each control channel of the automatic pilot system. In the interest of simplicity and brevity, these elements, therefore, will be described in detail for only one control channel. In the control channels of Figure 1 these elements are shown in block form and in Figure 2 in detail as elements 7, 8, 9, 10 with the clutch 12 for connecting and disconnecting the servomotor from its control surface.

Except for the damping rate generators, the signal developing devices herein are inductive devices which are in the nature of differential transformers. These devices are composed of a fixed stator and an energized relatively movable rotor. At a null position no signal is induced in the stator even though the rotor is energized. Displacement of the rotor from a null position induces a signal in the stator winding of the inductive device. The signal developed by an inductive device corresponds in magnitude to the extent of displacement of the rotor relative to the stator and in phase to the direction of displacement; the displacement corresponding to the deviation in attitude or position of the craft with respect to a predetermined attitude or position.

Figure 1:
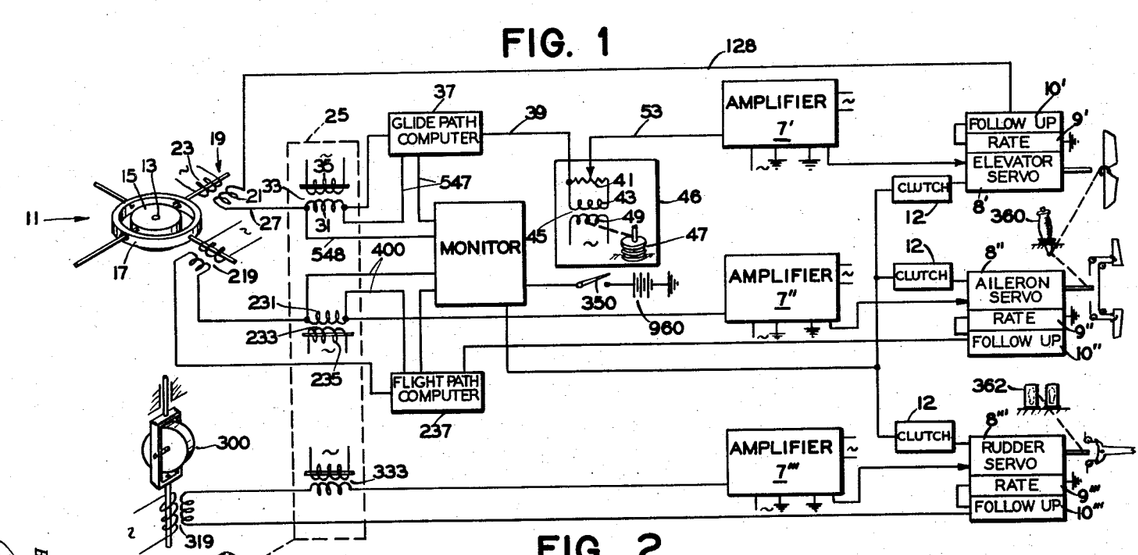
Figure 1 is a schematic illustration of an automatic pilot system with the novel monitoring system hereof associated therewith.

The vertical gyro 11, Figure 1, establishes an attitude reference for the roll and pitch axis of the aircraft. The rotor of gyroscope 11 is universally mounted and spins about a normally vertical axis 13 in an inner gimbal ring 15. The inner gimbal ring is mounted in an outer gimbal ring 17 on an axis at right angles to the spin axis, and the outer gimbal ring is mounted on the aircraft structure at right angles to the other two axes. Signal developing devices attached to each gimbal ring of vertical gyro 11 develop reference signals for the roll and pitch control channels of the automatic pilot system.

In the pitch reference signal developing device 19 for the pitch channel of the automatic pilot system, the energized rotor 23 is normally in a null position with respect to its stator 21 so that no signal is induced in the stator although the rotor is energized. Relative displacement of the rotor and stator due to a change in pitch attitude of the aircraft, however, induces a signal in the stator.

While the automatic pilot system functions to hold the craft in a given attitude, the human pilot may adjust the attitude of the craft and maneuver the craft manually through the automatic pilot system by a manual controller 25. After movement of controller 25, the automatic pilot maintains the craft in the adjusted position until the position of the controller is changed. Lead 27 conducts the pitch reference signal from stator 21 to the stator 31 of a second inductive device 33 in manual controller 25. The controller may be of the type described in U. S. Patent No. 2,516,796, issued July 25, 1950 to Paul Noxon and Norman Murphy, and assigned to the assignee of the present invention. By turning the energized rotor 35 relative to stator 31, manual controller 25 modifies the attitude signal for changing the attitude of the craft.

The signal from stator 31 may be transmitted through a glide path computer 37. When engaged (by means not shown), glide path computer 37 modifies the signal in accordance with a beam guidance system. One such computer is described in detail in U. S. Patent No. 2,592,193, issued April 8, 1952 to Paul Noxon et al. and assigned to the assignee of the present invention.

A lead 39 conducts the combined signal including a glide path computer signal, when the latter is being used, to a potentiometer 41 across the stator 43 of an inductive device 45. The signal developed in inductive device 45 corresponds to the deviation of a craft from a predetermined altitude. Inductive device 45 may be a portion of the altitude reference device described and claimed in U. S. Patent No. 2,512,902, issued June 27, 1950 to F. H. S. Rossire, and assigned to the assignee of the present invention. This altitude device 46 includes suitable means (not shown) to engage and disengage the pressure responsive aneroid 47 from rotor 49. When this device is engaged, pressure responsive aneroid 47 displaces the energized rotor 49 relative to stator 43 by an amount corresponding to the deviation of the craft from a predetermined altitude, inducing a signal in stator 43. This signal corresponds in amplitude to the amount of deviation and in phase to the direction of deviation. The signal combination appearing across potentiometer 41 is conducted by way of lead 53 to servoamplifier 7'.

Because the signals in the signal chain from the various signal developing devices are usually low in voltage, their characteristics are amplified in the servoamplifier by conventional vacuum tubes. To this end, lead 53 conducts the combined signal to the grid of an amplifier tube in servoamplifier 7' for a first stage of amplification.

Figure 2:
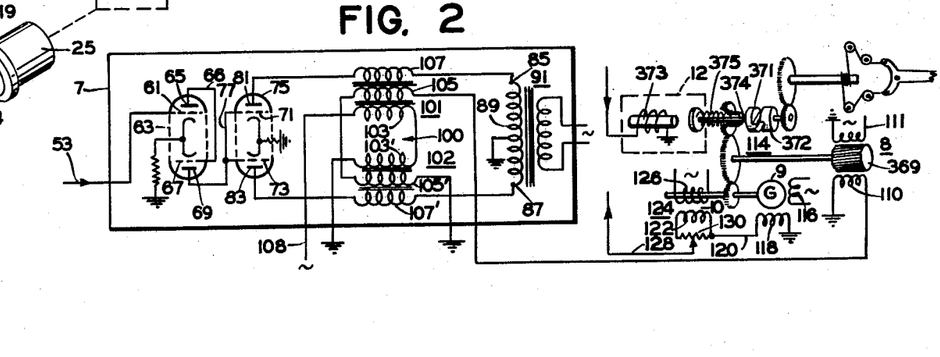
Figure 2 is a detailed schematic wiring diagram of a servoamplifier, servomotor, magnetic clutch, rate generator, and follow-up of one channel of the automatic pilot system of Figure 1.

Referring to Figure 2 for a detailed showing of the servomotor and amplifier, the signal combination from potentiometer 41 will be conducted by lead 53 to the grid 61 of amplifier tube 63 for a first stage of amplification. Lead 66 conducts the signal from plate 65 of amplifier 63 to the grid 67 for a second stage of amplification. The signal from plate 69 of amplifier 63 is applied to the grids 71 and 73 of a conventional phase discriminator 75.

Discriminator 75 detects the phase of the signal input to the servoamplifier and develops an output from the discriminator corresponding to the phase of the signal. At any given instant the phase of the signal voltage on grids 71 and 73 of discriminator 75 is always the same because the grids are tied together by a common lead 77. In contrast, the excitation of each plate 81 and 83 is always of opposite phase since the opposite ends 85, 87 of the center-tapped secondary winding 89 of power transformer 91 supplies this excitation. Only one plate will conduct at any one time as only one plate will be in phase relationship with the signal on the control grid. Therefore, the phase of the signal combination appearing on grids 71 and 73 determines whether plate 81 or 83 of discriminator 75 will conduct. The signal is conducted from plate 81 or 83 of discriminator 75 to a magnetic amplifier 100.

Magnetic amplifier 100 is comprised of transformers 101 and 102. Each transformer has three windings; a primary winding 103, 103', a secondary winding 105, 105', and a control winding 107, 107'. The primary windings 103, 103' are connected in series aiding relationship and are connected by lead 108 to be continuously energized by an alternating current source. The secondary windings 105, 105' are connected in series opposed relationship and form a closed circuit with the variable field winding 110 of the servomotor 8. The control winding of each transformer is connected to a plate of the discriminator 75.

Magnetic amplifier 100 develops an output corresponding in phase and magnitude to the signal from discriminator 75. A control winding of magnetic amplifier 100 is energized when either plate 81 or 83 conducts. When neither plate of discriminator 75 conducts current, the two voltages induced in the secondary windings of the transformers by the excitation of the primary windings are equal. Since the secondary windings are connected in series opposed relationship, the two equal induced voltages oppose each other and balance out so there is no resultant flow of current. A flow of current from either plate 81 or 83 tends to magnetically saturate the magnetic core of the transformer with D. C. flux. Depending upon the extent of the saturation of the core, induction between the primary and secondary windings of that transformer is reduced or cut off entirely. Induction still takes place between the primary and secondary windings of the other transformer whose control winding is not energized. Since the induction in one transformer is reduced, the opposing voltage will prevail and result in an output or flow of current through the circuit formed with the variable phase field 110 of the servomotor 8.

The operation of the two phase servomotor 8 converts the output of magnetic amplifier 100 into mechanical motion to correspondingly displace the control surfaces. The fixed phase winding 111 of servomotor 8 is continuously energized by an alternating current source. The secondary windings of magnetic amplifier 100 are wound in opposition so the direction of rotation of the reversible servomotor 8 depends upon which discriminator plate is conductive. In short, the servomotor tends to operate both directionally and proportionally to the signal received by servoamplifier 7 from the signal chain of the control channel. Servomotor 8 drives the control surfaces through a suitable gear train 114.

In automatic pilot systems, damping devices are provided to prevent oscillation of the aircraft. Were the altitude signal, manual control signal, attitude signal and beam guidance signal used alone, the craft would continually hunt or overswing the desired altitude, attitude or beam axis. Accordingly, a rate generator 9 and a follow-up device 10 develop signals to provide a damping action to prevent hunting of the surface and oscillation of the aircraft. These damping devices are geared to be driven through the gear train by the servomotor 8. One phase winding 116 of the rate generator 9 is continuously energized by an alternating current source. The signal voltage induced in the other winding 118 of rate generator 9 corresponds in amplitude and direction to the speed and direction of rotation of servomotor 8. Lead 120 connects phase winding 118 of rate generator 9 in series with the stator winding 122 of an inductive device 124 which constitutes the follow-up 10. In inductive device 124, the null position of rotor winding 126 relative to stator winding 122 coincides with the normal streamlined position of the control surface. The signal developed by inductive device 124 corresponds in amplitude to the amount of displacement of the control surface from its normal streamlined position and in phase to the direction of displacement. Lead 128 conducts the follow-up signal, after it has been adjusted to a suitable initial level by potentiometer 130, to the stator of the reference sensor 19 of the automatic pilot system.

In the automatic pilot system illustrated, the pitch channel servomotor 8' responds to a combination of signals from rate generator 9', follow-up device 10', vertical gyro 11, manual controller 25, and a glide path computer 37 when engaged, as well as altitude device 46. It is obvious, however, that other and different reference sensors and signal developing devices may be used.

The roll control channel for the ailerons is similar in many respects to the pitch control channel; the same type of servoamplifier, servomotor, and damping devices are used. The bank attitude reference signal developed in inductive device 219 on the bank axis of vertical gyro 11 corresponds in phase to the direction of banking of the aircraft and in amplitude to the extent of the banking. Inductive device 233 provides for manual control of the banking condition of the aircraft. A flight path computer 237, when engaged, permits the craft to be directed by a beam guidance system. The servoamplifier 7" provides a signal for the servomotor 8", which controls the aileron surfaces. Rate generator 9" and follow-up device 10" provide damping signals for the aileron surfaces. In the aileron control channel also, other and different signal developing devices and sensing devices may obviously be used.

In the yaw control channel, a conventional rate of turn gyro 300 takes into account the rate of turning of the craft about its yaw axis to develop a control signal for the servomotor for the rudder of the aircraft. The signal developed in the inductive device 319 that is attached to the rate of turn gyro 300 corresponds in amplitude to the rate of turning of the aircraft and in phase to the direction of the turning. Inductive device 333 provides for modification of the signal by manual controller 25. This signal combination, after passing through servoamplifier 7'" actuates servomotor 8'" to displace the rudder surface of the aircraft. The rate generator 9'" and follow-up device 10'" modify the rate of turning signal to prevent oscillation and hunting of the aircraft.

It is obvious that a compass or other conventional directional reference device if desired may be used with the automatic pilot system illustrated to insert signals into the ailerons and/or rudder to maintain the craft on a predetermined heading.

The human pilot, after he has taken the craft off from the airport, manually trims the aircraft for straight and level flight. He then actuates a switch (not shown) which by circuitry (not shown) warms up the electronic tubes of the automatic pilot system, starts the rotors of the gyros spinning, and operates the gyro erection system (not shown). After the two minutes required for this preconditioning, he closes the clutch switch 350 which engages the servomotors of the automatic pilot system with the control surfaces through clutches 12.

Although the automatic pilot will then maintain the craft in a predetermined attitude automatically, the human pilot may still maneuver the aircraft through the automatic pilot system by the manual controller 25 and by trim provisions (not shown).

When the aircraft is being flown cross country between airports, the human pilot may engage the flight path computer 237 which links radio beam navigation to the automatic pilot system; the aircraft will then automatically track the range beam. To do this the aircraft is maneuvered to bracket the beam and a switch (not shown) actuated to energize the flight path computer.

For instrument landing operations the craft is flown to bracket the localizer beam and the flight path computer 237 operated to respond to the localizer beam. As the glide path beam is bracketed, the glide path computer 37 is engaged (by means not shown). The craft will now automatically track the localizer beam as the craft moves forwardly and the glide path beam as the craft descends.

As the automatic pilot system is controlling the aircraft, a condition for some reason may arise that necessitates the human pilot's overpowering of the automatic pilot and his actuation of the control surface manually against the operation of the automatic pilot system. Accordingly, the servomotors of the automatic pilot are designed to have sufficient torque to move the control surfaces of the aircraft as required by the reference devices, yet the torque is limited to an amount that the human pilot may actuate the surfaces by the conventional manual controls of the craft against the operation of the servomotors by the automatic pilot system. In other words, to overpower the automatic pilot, the human pilot merely manipulates the conventional manual control column 360 or kicks the rudder pedals 362 and moves the control surfaces against their operation by the automatic pilot system.

In the embodiment herein, clutch 12 engages and disengages the servomotors of the automatic pilot system with the control surfaces. Should the human pilot manually actuate the control surface while the automatic pilot system is operating the surfaces he must, for example, actually turn the rotor 369 of the servomotor 8, Figure 2, through gear train 114 because clutch faces 371 and 372 of clutch 12 are engaged. These clutches, generally designated 12, are more fully described in the aforementioned application Serial No. 516,488.

Coil 373 controls the engagement of clutch faces 371 and 372. Thus, the clutch faces are engaged by shaft 374 when coil 373 is energized and are disengaged by spring 375 when coil 373 is not energized. Switch 350 controls the energization of coil 373. By suitably operating switch 350, the human pilot can disconnect the automatic pilot system from the control surfaces and operate the aircraft manually in the conventional manner.

The aircraft flies safely when all components of the automatic pilot system are functioning properly. The occurrence of a mechanical or electrical malfunctioning of a component of the automatic pilot system, however, may result in an unsafe condition of the aircraft. The novel monitoring system of the present invention automatically and continuously examines the operation of the automatic pilot. Upon an uncommon occurrence, the monitoring system disables the automatic pilot system. To this end, the novel monitoring system compares its own independent attitude and control surface position references with the roll and pitch functions of the automatic pilot system. When this comparison indicates differences exceeding predetermined safety limits, the novel monitoring system prevents the automatic pilot system from operating the craft and immediately provides audible and visible warnings for the human pilot. The safety limits for the differences are adjustable to provide the sensitivity desired by the operator or required for the craft.

The bank and pitch circuits of the novel monitoring system are generally similar. Since the bank circuit is simpler, it will be described first.

Figure 3:
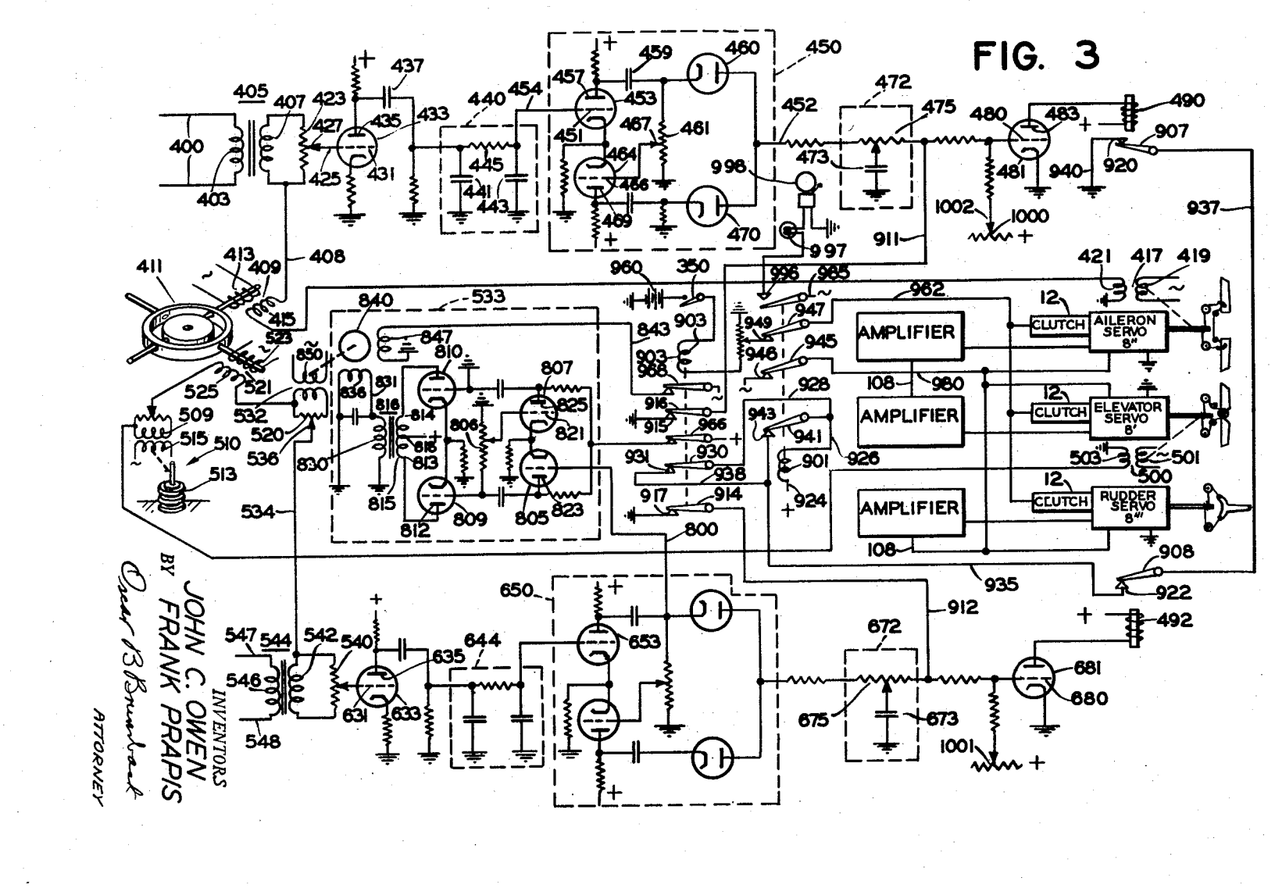
Figure 3 is a detailed schematic wiring diagram of the novel monitoring system of the present invention.

The bank circuit of the novel monitoring system illustrated in block form in Figure 1 is shown in detail in Figure 3. Leads 400 (Figure 1) conduct the manual control signal from winding 231 of inductive device 233 in the manual controller 25 to the bank circuit of the novel monitoring system (Figure 3). Leads 400 do this by connecting the opposite ends of stator winding 233 to the opposite ends of the primary winding 403 of an isolation transformer 405. The control signal developed in the manual controller 25 for the automatic pilot system, which also appears in the primary winding 403 of transformer 405, induces a like signal in the secondary winding 407. Lead 408 connects the secondary winding 407 of transformer 405 in series with the roll signal developing device 409 on the vertical gyro 411 of the monitoring system.

Vertical gyro 411 of the novel monitoring system may be of conventional type. This vertical gyro may be mounted on the control panel of the aircraft and used also as a visual horizontal attitude indicator. The inductive device 409 for developing the roll reference signal may have an energized rotor winding 413 mechanically connected to the bank axis of the vertical gyro and a fixed stator winding 415. The signal developed in stator winding 415 corresponds in amplitude to the extent of the banking of the aircraft and in phase to the direction of banking.

Connected in series with the roll reference signal device 409 is a surface position reference signal developing device 417. The energized rotor 419 of reference device 417 is connected in a suitable manner to the aileron surface and may be similar to the aileron follow-up device 10''. With this arrangement, the displacement of rotor 419 relative to stator 421 corresponds to the direction and amount of movement of the aircraft control surface from a normal position.

To form the signal chain for the novel monitoring system, one end of stator 421 of surface position reference device 417 is grounded; the surface position reference signal from stator 421 is algebraically added to the roll reference signal from stator 415; and this, in turn, is added to the manual control signal appearing at the potentiometer 423 across secondary winding 407; the manual control signal being induced by the manual controller 25 of the automatic pilot system. Lead 425 conducts this algebraic signal combination from tap 427 of potentiometer 423 to the grid 431 of amplifier 433.

Feedback of the monitoring system signal into the automatic pilot system is prevented by isolation transformer 405. The grid 431 of amplifier 433 has the effect of an infinite impedance; in other words, grid 431 acts as an open circuit. Little or no current flows in the signal chain of the novel monitoring circuit. As a result, no change of flux occurs across secondary winding 407 due to the signals from inductive devices 409 and 417, and the signals of the novel monitoring system are not fed back to the automatic pilot signal system.

On the other hand, leads 400 connecting the ends of stator winding 231 of inductive device 233 with the ends of winding 403 of transformer 405 form a closed circuit for the flow of current. The signal induced in stator winding 231 by rotor 235 effects a like signal in primary winding 403. In turn, the signal in primary winding 403 effects a signal in secondary winding 407.

The amplified signal from plate 435 of amplifier 433 is passed through a blocking condenser 437 and applied to a conventional low pass filter circuit 440. This filter circuit which includes capacitor 441, capacitor 443, and resistor 445 removes the high frequency components of the signal yet the circuit passes the low frequency component or fundamental harmonic without the higher harmonic signals.

A push pull amplifier arrangement 450 receives the signal from low pass filter 440 and develops a direct current output at lead 452. In amplifier 450, the output of low pass filter 440 is impressed upon the grid 451 of triode 453 by way of lead 454. The output from plate 457 of triode 453 is applied across a blocking condenser 459 and a voltage divider 461 to the cathode of a rectifier 460. The grid 466 of triode 464 is connected to tap 467 of voltage divider 461 between the output of amplifier 453 and ground. Plate 469 of amplifier 453 is connected to the cathode of a rectifier 470. Since grid 466 of tube 464 is energized from plate 457 of tube 453, the signal on plate 469 is opposite in phase to the signal on plate 457. Rectifiers 460 and 470 having their cathodes connected, respectively, to plates 457 and 469 provide a full wave rectification output to lead 452. This output is applied to a time delay circuit 472.

Time delay circuit 472 prevents the possibility of a transient signal disabling the automatic pilot system. The signal at the input to the time delay circuit must be sustained for the period of time of the delay circuit in order to build up a signal at the output of the delay circuit.

Capacitance 473 of the RC network in time delay circuit 472 is grounded, and resistor 475 is adjustable relative to the capacitance. A change in the resistance of resistor 475 changes the time delay period of the circuit. This adjustment permits the period of time during which the signal must exist before the monitor disables the automatic pilot system to be varied to suit the characteristics of the aircraft or the automatic pilot system with which the monitoring system is to be used. The output of time delay circuit 472 is applied to the grid 480 of control tube 481.

The output from plate 483 of control tube 481 energizes the solenoid coil of control relay 490. As will later be described, control relay 490 which is energized from the roll channel circuit, cooperates with a control relay 492 which is energized from the pitch channel circuit. The cooperative action of relays 490 and 492 forms an interlock for disconnecting the automatic pilot system in the event of a malfunctioning of the automatic pilot system.

The pitch channel of the novel monitoring system is generally similar to the above described roll channel. An elevator surface position transmitter 500 in the pitch channel is similar to the aileron surface position transmitter device 417 in the roll channel. Rotor 501 is energized and mechanically connected to the elevator surface. Since the displacement of rotor 501 relative to stator 503 corresponds to the displacement of the elevator surface from its normal streamlines position, the signal induced in stator winding 503 corresponds in amplitude to the extent of displacement of the elevator surface from its normal position and in phase to the direction of displacement. Stator winding 503 is connected in series to the stator 509 of the altitude reference device 510.

Altitude reference device 510 may be similar to that described in the aforesaid U. S. Patent No. 2,512,902. The two aneroids, 47 of the altitude device 46 in the automatic pilot system and 513 of the altitude device 510 in the monitoring system, may be interlocked to engage and disengage simultaneously (by means not shown). The pressure responsive aneroid 513, when engaged, displaces an energized rotor 515 by an amount corresponding to deviation of the craft from a predetermined altitude. The signal induced in stator 509 corresponds in amplitude to the amount of deviation and in phase to the direction of deviation. The combination of the surface position signal and the altitude reference signal is algebraically added to the pitch reference signal of inductive device 521 on the vertical gyroscope 411.

The energized rotor 523 of inductive device 521 is mechanically connected to vertical gyroscope 411 for displacement in accordance with the attitude of the aircraft about the pitch axis. The signal induced in stator winding 525 corresponds in amplitude to the amount of displacement of the craft about its pitch axis and in phase to the direction of displacement. The signal combination from stator 525 is transmitted through potentiometer 520 across an inductive device 532 of a synchronizer 533 later to be described.

The signal combination from wiper 536 of potentiometer 530 is applied by way of lead 534 to a potentiometer 540 across the secondary winding 542 of coupling and isolation transformer 544. The primary winding 546 of transformer 544 has its ends connected by leads 547 and 548 across the winding 31 of inductive device 33 in manual controller 25. The pitch attitude control signal from the manual controller 25 of the automatic pilot system is thus added to the novel monitoring system at isolation transformer 544. There is no feedback of the signals from the novel monitoring system into the pitch channel of the automatic pilot system for the reasons discussed above with respect to the roll control channel.

The algebraic combination of an elevator surfaces reference position signal, altitude reference signal, pitch reference signal, synchronizer signal, and manual controller signal is applied to the grid 631 of amplifier 633. The output signal from plate 635 of amplifier 633 is applied to a low pass filter circuit 644 whose output is applied to a push pull amplifier 650; the output of push pull amplifier 650 is applied to a delay circuit 672; and the output of delay circuit 672 is applied to the grid 680 of a control tube 681 whose output energizes control relay 492.

While the roll attitude of an aircraft is the same under any normal flight configuration, the pitch attitude of the aircraft varies with such factors as the gross weight of the aircraft, the position of the center of gravity of the craft, the thrust of the motor, the airspeed of the craft, and the vertical speed of the craft. To compensate for these factors, additional subassemblies and circuitry in the form of synchronizer 533 are required in the pitch circuit.

Synchronizer 533 is comprised generally of an amplifier for receiving a signal indicative of the pitch attitude of the craft, a motor for responding to the signal from the amplifier, and a signal developing device actuated by the motor for developing a signal to cancel out the signal indicative of the attitude of the craft.

To provide an input for synchronizer 533, a lead 800 conducts the output of amplifier 653 in push pull amplifier 650 to a triode 805. The signal output of triode 805 is applied across a voltage divider 806 and the signal from voltage divider 806 is applied to triode 807. The output of amplifiers 805 and 807 is further amplified by amplifiers 809 and 810. Plates 811 and 812 of amplifiers 809 and 810 are connected for excitation to the ends 813 and 814 of the primary winding 815 of a transformer 816, the center tap 818 of winding 815 being connected to a suitable D. C. source. Grid 821 of the tube 807 receives its signal through voltage divider 806 from plate 823 of tube 805. The signal from plate 825, therefore, has a phase opposite to the phase of the signal from plate 823. These signals from plates 823 and 825 are connected through amplifiers 809 and 810 to the opposite ends of primary winding 815, the signals from amplifiers 809 and 810 being in aiding relationship in the primary winding.

The secondary winding 830 of transformer 816 is connected by lead 831 to energize the variable phase winding 836 of a two phase servomotor 840. The fixed phase winding 847 of servomotor 840 is continuously energized by lead 843 from a source of alternating current. Depending upon the phase of the excitation current in lead 831 with respect to the excitation of winding 847, motor 840 will rotate in a clockwise or counterclockwise direction. Motor 840 is mechanically connected to the rotor 850 of inductive device 532.

The aircraft because of its loading may, for example, be flying with its nose elevated with respect to the horizon to maintain a constant altitude. A signal indicative of the pitch attitude will be developed in stator winding 525 of inductive device 521 on vertical gyro 411. This signal corresponds in amplitude and phase to the direction and amount of variation from the true horizontal. After being amplified by amplifiers 635 and 653, this signal is conducted by lead 800 to the circuit of synchronizer 533. After amplification by amplifiers 805, 807, 809 and 810, in the synchronizer circuit, a signal is induced on secondary winding 830. Depending upon the phase of this signal, motor 840 will be driven in a clockwise or counterclockwise direction and turn rotor 850 to nullify the signal from the vertical gyro appearing in the stator of inductive device 532. Because of a relay system later to be described, pitch synchronizer 533 is operative only when the automatic pilot is energized but is not engaged with the control surfaces of the craft.

The relay system for the novel monitoring system is comprised of solenoid actuated control relays 490 and 492, holding relay 901 and a disconnecting relay 903. In Figure 3, the relays are shown in the position they assume when the automatic pilot system has been energized but has not been engaged with the control surfaces.

Control tubes 481 and 681 supply the energization for control relays 490 and 492. As soon as the automatic pilot system is turned on to warm up the tubes and precondition the automatic pilot system, current flows through control tubes 481 and 681. This current energizes control relays 490 and 492 which then engage their respective armatures 907 and 908 with their contacts.

To insure the operation of control relays 490 and 492, the portion of the monitoring circuit in front of control tubes 481 and 681 is shunted by leads 911 and 912. These leads ground resistors 475 and 675 through armatures 914 and 916 of the disconnecting relay 903. Armatures 914 and 916 are in engagement with grounded contacts 915 and 917 at this time.

Conventional relays, such as control relays 490 and 492 usually require a larger flow of current to engage initially the armatures of the relays with their related contacts than is later required to maintain the engagement of the armatures with the contacts. Occasionally, before the engagement of the automatic pilot system with the control surfaces, a sufficient signal output may be present from amplifiers 450 and 650 to reduce the current flow through control tubes 481 and 681. This reduction in current flow may be to such an extent that control relay 490 and 492 would not engage armatures 907 and 908 with contacts 920 and 922. The grounding of leads 911 and 912 removes any signal which may exist in the monitoring system prior to the engagement of the automatic pilot system. Tubes 481 and 681, then, will conduct a flow of current to energize control relays 490 and 492 so that armatures 907 and 908 will engage with their contacts.

The energization of control relays 490 and 492 permits the energization of holding relay 901. With relays 490 and 492 energized, current will flow from a suitable source connected to lead 924 through the coil of relay 901, leads 926, 928, armature 930 and contact 931 of disconnecting relay 903 (armature 930 and contact 931 being in engagement at this time), leads 938, 935, contact 922 and armature 908 of control relay 492, lead 937, armature 907 and contact 920 of control relay 490, and lead 940 to ground. This current flow energizes holding relay 901. Once the holding relay 901 is energized, it continues to be energized until one of the control relays 490 and 492 are deenergized.

When relay 901 is energized, armature 941 engages contact 943, armature 945 engages contact 946, and armature 947 engages contact 949. With armature 941 engaging contact 943, the energization of holding relay 901 continues even though armature 930 of the disconnecting relay 903 may be disengaged from contact 931 opening the circuit formed by leads 928 and 938.

Disconnecting relay 903 is shown in Figure 3 in the relaxed or deenergized position. When switch 350 is moved to a closed circuit position to energize the clutches 12 which connect the servomotors with the control surfaces, the disconnecting relay 903 is also energized. This circuit includes battery 960, switch 350, the coil of disconnecting relay 903, contact 949 and armature 947 of holding relay 901 and lead 962.

In this embodiment the clutches for the servomotors are connected in parallel with the energizing source although it is obvious that other and different connections may be used; for example, a separate contact and armature may be provided for each clutch and each armature be actuated by holding 901. Similarly, armature 945 of holding relay 901 and contact 946 permits (1) the excitation of the fixed phase of the servomotors since they are connected in parallel to lead 980 and (2) the excitation of the primary winding of magnetic amplifiers 100 as they are also connected in parallel to lead 980. It is obvious, however, that armatures actuated by relay 901 may be provided to control the excitation of each element individually.

Disconnecting relay 903 is energized by the switch 350 which engages the automatic pilot system with the control surfaces. Engagement of the automatic pilot system with the control surfaces of the aircraft by energizing relay 903 has the following effect: (1) Armature 968 by disengaging from its contact deenergizes the fixed phase winding 847 of motor 840 of pitch synchronizer 533; (2) armature 966 by disengaging from its contact removes the excitation from the plates of amplifiers 805 and 807 of synchronizer 533; (3) armatures 914 and 916 by disengaging from their respective contacts stop the shunting action of leads 911 and 912; and (4) armature 930 by disengaging from contact 931 opens the circuit formed by leads 928 and 938. The energization of relay 903 stops the operation of synchronizer 533 and starts the operation of control tubes 481 and 681 from amplifiers 450 and 650.

During normal operation of the automatic pilot system, no signal appears at the output of either amplifier 450 in the roll channel or amplifier 650 in the pitch channel of the monitoring system because the signals in the signal chain of the monitoring system and the signals from manual controller 25 of the automatic pilot system are balanced. Upon the malfunctioning of the automatic pilot system about either the pitch or roll axis, a signal will appear in the monitoring system as will be discussed later. The signal will increase the bias on grid 480 or 680 reducing the current flow through control tubes 481 or 681. When the current is reduced to a predetermined value, it deenergizes control relays 490 or 492 and armature 907 or 908 disengages from its contact 920 or 922. Armatures 907 and 908 are connected in series. The disengagement of either armature from its contact, therefore, opens the circuit which energizes holding relay 901, and relay 901 is deenergized.

Armatures 945 and 947 of relay 901 by disengaging from their contacts upon the deenergizing of relay 901 interrupt the energy source to the primary winding of magnetic amplifier 100 to cut off the control signal from the automatic pilot system to the servomotors, deenergize the servomotors by deenergizing their fixed phase windings, and disconnect the servomotors from the control surfaces by deenergizing the clutches 12. Obviously, though, the circuit may be arranged to cut off the control signal only, to cut off the excitation to the fixed phase only, to disconnect the automatic pilot only or any combination of these.

Variable resistors 1000 and 1001 permit the individual adjustment of the bias on grids 480 and 680 of control tubes 481 and 681. This sets the limits of the displacement signal due to the change in craft attitude or position that is necessary to reduce the flow of current from the control tubes to relays 490 and 492 sufficiently to permit the armatures 907 and 908 of these relays to disengage from their contacts 920 and 922. The strength of the signal caused by an abnormality in operation of the automatic pilot system that is necessary to render the automatic pilot system ineffective to control the aircraft is adjustable independently for each channel.

The adjustment of resistors 475 and 675 relative to capacitors 473 and 673 permit the time delay period for each channel of the novel monitoring system to be adjusted independently. This time period adjustment is desirable because an interval of time may elapse between the appearance of command signal in the automatic pilot system in response to a condition needing correction and the actual displacement of the control surface in response to the command signal to correct the condition. Further, the adjustable time period prevents transient signals from affecting the control tubes.

When displacement limits for a signal due to the attitude of the craft and time limits of the time delay circuits are exceeded, the amplified signal which appears on grid 480 or 680 of a control tube 481 or 681 reduces the current to relays 490 or 492 and the automatic pilot system is disengaged. At this time holding relay 901 is deenergized, and armature 985 and contact 996 of relay 910 engaged to give suitable visual and auditory warnings to the human pilot by way of a suitable light 997 and bell 998.

With the manual controller 25 in its centered position and the automatic pilot engaged with the control surfaces, the attitude reference devices of the automatic pilot operate appropriate servomotors to maintain the aircraft in a predetermined attitude. As an illustration, assume that the aircraft is being flown in a straight and level attitude and for some reason (for example, an external disturbance such as a gust acting on one wing surface) the aircraft is placed in a banked condition. The bank take off 219 (Figure 1) on the vertical gyro 11 of the automatic pilot system measures the bank attitude of the craft and develops a corresponding bank reference signal. Servomotor 8″, responding to the reference signal from bank take off 219, displaces the ailerons in a direction to correct the banked condition. The displacement of the ailerons from their normal streamlined position by the servomotor continues until the signal developed in the follow-up device 10″ because of this displacement becomes equal and opposite to the bank reference signal. The servomotor at this time has its variable phase winding deenergized, and displacement of the ailerons stops. Because of the aileron displacement, the craft returns to the predetermined attitude and the bank reference signal diminishes. The follow-up signal, now being greater than the bank reference signal and being of an opposite phase, operates the servomotor in a reverse direction to return the ailerons to their streamlined position. As the aircraft reaches the predetermined position, both the bank reference signal and the follow-up signal will have become null and the control surface will be in the streamlined position.

Manual controller 25 is an attitude controller for the aircraft; when displaced from a center position, the controller maintains the craft in a particular attitude although the control surfaces have returned to their normal streamlined position. The position to which the manual controller is displaced determines the predetermined attitude to which the craft is flown by the automatic pilot system.

For purposes of simplicity in illustrating the action of controller 25, only the bank channel of the automatic pilot system will be considered; and the craft will be considered as flying in a straight and level attitude. Upon the displacement of knob 24 of the manual controller 25 from center, a signal is developed in inductive device 233 of controller 25; rotor 235 being displaced relative to its stator 231 (by suitable means not shown). In response to this signal, the aileron servomotor 8" displaces the aileron surfaces to maneuver the craft into a bank attitude. As the bank attitude of the craft increases, the signal from the bank take off 219 on vertical gyro 11 which is opposite in phase to the manual control signal from stator 231 approaches in amplitude to the amplitude of the manual control signal. Meanwhile, the follow-up signal from follow-up device 10" has been bringing the ailerons back to streamline position. As the aircraft reaches a banked condition where the attitude signal from inductive device 219 on vertical gyro 11 is exactly equal and opposite to the manual controller signal from inductive device 233 of the manual controller 25, the ailerons are in their normal streamlined position and the follow-up signal is null. The automatic pilot system, by operating the same way as discussed above when the manual controller was in its centered position, will maintain the craft in the particular bank attitude called for by the manual controller until such time as the controller is again manually adjusted.

With the manual controller 25 in its center position and the automatic pilot systems engaged with the control surfaces, rotor 235 of inductive device 233 of the manual controller is in a null position with respect to stator 231. At this time, no signal is induced in stator 231. Accordingly, the novel monitoring system will receive no signal from the manual controller across the potentiometer 423 which is connected to the isolation transformer 407. However, the attitude take off 409 on the vertical gyro 411 of the monitoring system develops signals corresponding to the attitude of the craft about its roll axis, should the aircraft depart from the predetermined position for some reason. The automatic pilot system responds to roll attitude signals developed by its vertical gyro 11 because of this departure. In response to this signal, the servomotor corrects for the departure in attitude from the predetermined roll attitude by displacing the ailerons from a streamlined position. At the same time, the surface position reference device 419 of the monitoring system develops a signal corresponding to the position of the ailerons; this signal being opposite in phase and amplitude to the roll attitude signal developed from the attitude take off 409 on vertical gyro 411. These signals balance out in the monitoring system so no signal will appear at the output of amplifier 450. Any time lag between the change in attitude of the aircraft and the displacement of the control surfaces from their streamlined position by the automatic pilot system may be taken care of by the time delay circuit 472 in the novel monitoring system.

Displacing the manual controller 25 from its center position orders a change in craft attitude. The attitude take offs 409 and 521 on the vertical gyro 411 of the novel monitoring system operate in a manner similar to the attitude take offs 19 and 219 on the vertical gyro 11 of the automatic pilot system to measure this attitude and develop corresponding signals. However, when the aircraft has reached the attitude called for by the displacement of the manual controller, the control surface has been returned to its normal streamlined position by the follow-up device of the automatic pilot system. The surface position reference signal will be null.

For simplicity the bank channel will be described to illustrate the action of the monitoring system when the manual controller 25 has been displaced from a center condition to order a particular roll attitude of the craft. The signal from the surface position reference device 417 of the novel monitoring system, then, will be null; the signal from the attitude take off 409 on vertical gyro 411 will be of some finite value because the roll attitude of the aircraft is no longer that roll attitude which cor-
responds to the null position of the roll take off. This signal from take off 409 would be sufficient to cause the novel monitoring system of the present invention to render the automatic pilot system ineffective for operating the control surfaces of the aircraft. To balance the attitude signal, the signal from the manual controller 25 is inserted into the novel monitoring system. To this end, leads 400 connect stator 231 in manual controller 25 and the primary winding 403 of isolation transformer 407; the signal from the manual controller being so connected as to apply the signal into the monitoring system in opposition to the roll attitude signal from the vertical gyro 411. Hence, just as the signal from the attitude take off 219 on the vertical gyro 11 in the automatic pilot system is equal and opposite to the signal of the manual controller 25 so the signal from the take off 409 of the vertical gyro 411 of the novel monitoring system is balanced by the signal from the manual controller 25 that is coupled across the isolation transformer 405.

In a manner similar to that discussed above, the radio guide beam systems through glide path computer 37 and flight path computer 237 control the attitude of the craft. Accordingly, these signals are also coupled across their respective isolation transformers in series with the manual controller signal to balance the attitude reference signals of vertical gyro 411 of the novel monitoring system.

The trimming of the pitch attitude of the aircraft by the human pilot, for example, by raising the nose of the plane before the automatic pilot has been engaged does not affect the position of rotor 35 in the manual controller. The servomotor is disconnected from the control surfaces so the signal from the vertical gyro 11 will cause the pitch servomotor to run. Since the follow-up device is connected to the servomotor, the servomotor runs until the follow-up signal that is developed cancels out the signal from the vertical gyro of the automatic pilot system. The synchronizer 533 of the novel monitoring system has the same effect, namely, that of cancelling out the signal from the vertical gyro 411 before the automatic pilot system is engaged with the control surfaces.

Normally, the signals from the take off 521 on the vertical gyro 411 and the surface position reference device 500 balance out so that no signal appears at the input to amplifier 650. However, should the pitch attitude of the aircraft be different than the normal horizontal, a signal will be developed by take off 521 of vertical gyro 411. This signal is conducted by way of lead 800 to synchronizer 533. The synchronizer, in response to the signal, drives rotor 850 to cancel the signal. When the automatic pilot is engaged, the synchronizer is deenergized by relay 903.

The automatic pilot system may become defective while it is controlling the aircraft. To illustrate this situation, the bank channel will be discussed. Due to a malfunctioning of the automatic pilot system the aileron servomotor will be operated to displace the ailerons to place the craft in a roll attitude. The displacement of the ailerons, as detected by surface reference pick off 417 of the novel monitoring system, will be in the same direction as the roll attitude induced by the automatic pilot system. For this reason, the signal of pick off 417 resulting from the displaced control surfaces which cause the changed craft attitude, although not necessarily equal in magnitude to the signal of attitude pick off 409 on vertical gyro 411 of the monitoring system, will be in phase with the signal of attitude pick off 409.

The unbalance signal developed across potentiometer 423 will be applied by way of lead 425 to amplifier 433. The signal output from amplifier 433 will pass through filter circuit 440 and be further amplified by push pull amplifier 450. When the signal has existed long enough, it will appear at the output of time delay device 472 and will be impressed upon grid 480 of the control tube 481 which controls the current to relay 490.

Any signal appearing on grid 480 of control tube 481 diminishes the current which flows from this tube to the relay. When this signal has reached a predetermined magnitude, the current flowing from control tube 481 to the relay 490 has been reduced sufficiently to deenergize the relay, disabling automatic pilot system. The bias on grid 480 of control tube 481 due to the position of wiper 1002 on resistor 1000 determines the magnitude of the signal that is necessary to deenergize relay 490.

Although the automatic pilot system maintains the craft in a predetermined position on attitude about the pitch, roll and yaw axes, occasional conditions such as an updrift, downdrift change in flying speed, etc. may result in a positional change in altitude of the aircraft without a corresponding attitude change. An altitude device 46, therefore, is provided to maintain the craft at a desired altitude.

Upon a change in altitude of the craft, the corresponding signal developed by inductive device 45 of altitude device 46 will actuate servomotor 8' to displace the elevators to return the craft to the desired altitude; the displacement of the elevators placing the craft in a climb or dive attitude. The signal from the pitch take off 19 of the vertical gyro 11 becomes equal and opposite to the signal from the altitude device 46 as the pitch attitude of the craft changes. Meanwhile, the follow-up signal, also being in opposition to the altitude signal, will actuate the servomotor to return the elevators to their streamlined position. The automatic pilot system will have placed the craft in the correct climb or dive attitude to return the craft to the desired altitude; the aircraft will be climbing or diving; yet the elevators will be in a streamlined position. The signal from the pitch take off 19 on the vertical gyro 11 will be equal and opposite to the altitude signal from altitude device 46.

When the aircraft has assumed a climb or dive attitude to return to a desired altitude, the signal from pitch attitude pick-off 521 on vertical gyro 411 of the monitoring systems will be of a value corresponding to the pitch attitude of the craft; at the same time, the signal from the elevator surface position reference device 500 will be null because the elevators will have been returned to their streamlined position. This difference in signals in the monitoring system may be sufficient to render the automatic pilot system ineffective to operate the control surfaces of the aircraft. Therefore, altitude device 510 in the monitoring system is provided to insure a signal corresponding to the change in altitude in the signal chain of the monitoring system. Just as the signal of the attitude device 46 in the automatic pilot system balances the attitude signal from take off 19 on the vertical gyro 11, so the signal from altitude device 510 in the monitoring system balances the signal from take off 521 on the vertical gyro 411.

Although the automatic pilot system is maintaining the aircraft at a desired altitude in a predetermined attitude about the pitch, roll, and yaw axis of the craft, a condition may arise which requires the human pilot to manually operate the control surfaces by means of his conventional control column 360 or rudders 362 and displace the surfaces against the action of the automatic pilot system. As discussed previously, the servomotors for the various surfaces are so designed as to allow the human pilot to overpower the action of the automatic pilot system.

Should the human pilot manually overpower the action of the automatic pilot system by kicking the rudder pedals 362 or by suitably manipulating the conventional manual control 360 while the automatic pilot system is controlling the craft, the novel monitoring system will render the automatic pilot system ineffective for operating the control surfaces of the aircraft without the need for the human pilot's reaching for other disconnect devices (such as switch 350) that may have been designed for disconnecting the automatic pilot system from the control surfaces. The human pilot's actuation of the control surfaces will have changed the balanced condition at the input to amplifiers 433 and 633 of the novel monitoring system. The signal from the attitude take off 409 or 521 on the vertical gyro 411 and from its associated surface position reference 417 or 500 will be in phase with each other; consequently, a sufficient signal will be provided on the grid of control tube 481 or 681 to deenergize relay 490 or 492, causing the automatic pilot to be rendered ineffective to operate the control surfaces of the aircraft.

As far as the power source is concerned, the novel monitoring system is self monitoring. Should the power source to the monitoring system fail, the relays are deenergized and the monitoring system renders the automatic pilot system ineffective to operate the craft.

It will now be apparent to those skilled in the art that a novel and simple device for monitoring the operation of an automatic pilot has been presented. This novel device remains inactive during normal operation of the automatic pilot system but becomes effective during abnormal operation of the automatic pilot to render the automatic pilot ineffective to operate the craft and simultaneously warns the human pilot of the abnormal condition. Normal operation or maneuvers of the craft by manual control through the automatic pilot system or by beam guidance control will not impair the efficiency of the monitoring system even under adverse flying conditions such as caused by bad weather. Also while the novel monitoring system has been shown as associated with the pitch and roll control channel, it could obviously be associated with the yaw control channel as well by providing duplicates of the yaw control reference devices for a yaw channel of the monitor.

Although but a single embodiment of the present invention has been illustrated and described in detail, it is to be expressly understood that the invention is not limited thereto. Various changes can be made in the design and arrangement of the parts without departing from the spirit and scope of the invention as will now be apparent to those skilled in the art.

We claim:

1. For use with an automatic steering system for positioning control surfaces of an aircraft so as to maintain the aircraft in flight at predetermined pitch and roll attitudes, said system including means for developing output control signals corresponding to said predetermined attitudes; a monitoring system comprising input means for receiving the control signals from the output means of the automatic steering system, pitch and roll attitude responsive means for developing signals corresponding to the pitch and roll attitudes of said aircraft in flight, comparator means operatively connecting the attitude responsive means and said input means for comparing the aforesaid control signals with said pitch and roll attitude signals so as to develop a resultant signal corresponding to the difference between the predetermined roll attitude signal and the signal of the roll attitude of the aircraft in flight and another resultant signal corresponding to the difference between the predetermined pitch attitude signal and the signal of the pitch attitude of the aircraft in flight, control means associated with said comparator means and said automatic steering system for receiving said resultant signals, said control means being effective upon any of said resultant signals exceeding a predetermined value to render said automatic steering system ineffective for positioning the control surfaces of the aircraft.

2. For use with an automatic steering system for positioning control surfaces of an aircraft so as to maintain the aircraft in flight at predetermined pitch and roll attitudes, said system including means for developing output control signals corresponding to said predetermined attitudes; a monitoring system comprising input means for receiving the control signals from the output means of the automatic steering system, pitch and roll attitude responsive means for developing signals corresponding to the pitch and roll attitudes of said aircraft in flight, comparator means operatively connecting the attitude responsive means and said input means for comparing the aforesaid control signals with said pitch and roll attitude signals so as to develop a resultant signal corresponding to the difference between the predetermined roll attitude signal and the signal of the roll attitude of the aircraft in flight and another resultant signal corresponding to the difference between the predetermined pitch attitude signal and the signal of the pitch attitude of the aircraft in flight, control means associated with said comparator means and said automatic steering system for receiving said resultant signals, said control means being effective upon any of said resultant signals exceeding a predetermined value to render said automatic steering system ineffective for positioning the control surfaces of the aircraft, time delay means for providing a predetermined period of time during which said resultant signal must persist before said control means is rendered effective as aforesaid, said time delay means including adjustable means for varying the predetermined delay period.

3. For use with an automatic steering system for positioning control surfaces of an aircraft so as to maintain the aircraft in flight at predetermined pitch and roll attitudes, said system including means for developing output control signals corresponding to said predetermined attitudes; a monitoring system comprising input means for receiving the control signals from the output means of the automatic steering system, pitch and roll attitude responsive means for developing signals corresponding to the pitch and roll attitudes of said aircraft in flight, comparator means operatively connecting the attitude responsive means and said input means for comparing the aforesaid control signals with said pitch and roll attitude signals so as to develop a resultant signal corresponding to the difference between the predetermined roll attitude signal and the signal of the roll attitude of the aircraft in flight and another resultant signal corresponding to the difference between the predetermined pitch attitude signal and the signal of the pitch attitude of the aircraft in flight, operator-operative means for positioning the control surfaces of the aircraft independently of said automatic steering means, said comparator means including synchronizing means operative to vary the datum of the pitch attitude responsive means, control means associated with said comparator means and said automatic steering system for receiving the aforementioned resultant signals and effective upon any of said resultant signals exceeding a predetermined value to render said automatic steering system ineffective for positioning the control surfaces of the aircraft and to simultaneously render said synchronizing means effective to vary the datum of the pitch attitude responsive means, said synchronizing means when so rendered effective being controlled by the pitch attitude resultant signal so as to compensate said comparator means for variations in the pitch attitude of the aircraft due to the positioning of the control surfaces of the aircraft by the operator-operative means.

4. The combination defined by claim 3 in which said control means includes a time delay means for providing a predetermined period of time during which the resultant signal must persist before said control means is rendered effective, and said time delay means including adjustable means for varying the predetermined delay period.

5. In an automatic steering system for operating control surfaces of an aircraft to maintain said aircraft in a predetermined position, said aircraft being subjected at times to transient conditions, said automatic steering system being normally effective for displacing at least one of said control surfaces upon a deviation of said craft from said predetermined position to return the craft to said predetermined position and including means for developing an output corresponding to said predetermined position; a monitoring system comprising first reference means responsive to deviations of said craft from a predetermined position for developing an output corresponding to said deviation, second reference means responsive to displacement of said control surfaces from a predetermined position for developing an output corresponding to said displacement, comparing means operatively connected with said first and second reference means and said automatic steering system and responsive to the aforementioned outputs for developing a control effect corresponding to the difference between the position of said craft in flight and said first mentioned predetermined position, and control means associated with said comparing means and said automatic steering system and responsive to said control effect for rendering said automatic pilot system ineffective for controlling said surfaces, said control means including means for varying the sensitivity of said control means to said control effects due to transient conditions of said craft.

6. In an automatic steering system for operating control surfaces of an aircraft to maintain said aircraft in a predetermined position, said automatic steering system being normally effective for displacing at least one of said control surfaces upon a deviation of said craft from said predetermined position to return the craft to said predetermined position and including means for developing an output corresponding to said predetermined position, craft attitude changing means associated with said automatic steering system and operative when actuated for modifying said automatic stering system so as to maintain said craft in a condition different from said predetermined position; the combination comprising first reference means responsive to deviations of said craft from a predetermined position for developing an output corresponding to said deviation, second reference means responsive to displacement of said control surfaces from a predetermined position for developing an output corresponding to said displacement, comparing means operatively connected with said first and second reference means and said automatic steering system and responsive to the aforementioned outputs for developing a control effect corresponding to the difference between the maintained position of said craft and said first mentioned predetermined position, control means associated with said comparing means and said automatic steering system and responsive to said control effect for rendering said automatic steering system ineffective for controlling said surfaces, and said comparing means including compensating means associated with said attitude changing means and rendered operative by said control means to compensate said comparing means for the change in position of said craft while said automatic steering system is rendered ineffective.

7. The combination comprising an automatic steering system for operating control surfaces of an aircraft to maintain said aircraft in a predetermined position, means for setting said predetermined position, said automatic steering system being normally effective for displacing at least one of said surfaces upon a deviation of said craft from said predetermined position to return the craft to said predetermined position and including means for developing an output corresponding to said predetermined position, operator-operative controlled means associated with said automatic steering system and effective when actuated for modifying said automatic steering system so as to maintain said craft in a position different from said predetermined position, first reference means responsive to deviations of said craft from a predetermined position for developing an output corresponding to said deviation, second reference means responsive to displacement of said control surfaces from a predetermined position for developing an output corresponding to said displacement, comparing means operatively connected with said first and second reference means and said automatic steering system and responsive to the aforementioned outputs for developing a control effect corresponding to the difference between the maintained position of said craft and said first mentioned predetermined position, relay means associated with said comparing means and said automatic steering system and responsive to said control effect for rendering said automatic steering system ineffective for controlling said surfaces, said comparing means including compensating means associated with said predetermined position setting means and said operator-operative controlled means and rendered operative by said relay means to compensate said comparing means for the change in position of said craft while said automatic steering system is rendered ineffective.

8. In an automatic steering system for operating control surfaces of an aircraft to maintain said aircraft in a predetermined position, said automatic steering system being normally effective for displacing at least one of said surfaces upon a deviation of said craft from said predetermined position to return the craft to said predetermined position and including means for developing an output corresponding to said predetermined position, beam guidance means associated with said automatic steering system and operative for modifying said predetermined position, first reference means responsive to deviations of said craft from a predetermined position for developing an output corresponding to said deviation, second reference means responsive to displacement of said control surfaces from a predetermined position for developing an output corresponding to said displacement, comparing means operatively connected with said first and second reference means and said automatic steering system, said comparing means being responsive to the aforementioned outputs for developing a control effect corresponding to the difference between the actual position of said craft in flight and said first mentioned predetermined position, control means associated with said comparing means and said automatic steering system and responsive to said control effect for rendering said automatic steering system ineffective for controlling said surfaces, and said comparing means including compensating means associated with said beam guidance means and rendered operative by said control means to compensate said comparing means for the change in position of said craft so long as said automatic steering system is rendered ineffective.

9. In an automatic steering system for operating control surfaces of an aircraft to maintain said aircraft in a predetermined position, said automatic steering system being normally effective for displacing at least one of said surfaces upon a deviation of said craft from said predetermined position to return the craft to said predetermined position and including means for developing an output corresponding to said predetermined position, operator-operative means for controlling the surfaces of said craft independently of said automatic steering system to maintain said craft in a position different from said predetermined position, first reference means responsive to deviations of said craft from a predetermined position for developing an output corresponding to said deviation, second reference means responsive to displacement of said control surfaces from a predetermined position for developing an output corresponding to said displacement, comparing means operatively connected with said first and second reference means and said automatic steering system and responsive to the aforementioned outputs for developing a control effect corresponding to the difference between the maintained position of said craft and said first mentioned predetermined position, control means associated with said comparing means and said automatic steering system and responsive to said control effect for rendering said automatic steering system ineffective for controlling said surface upon operation of said operator-operative means.

10. In an automatic steering system for operating control surfaces of an aircraft to maintain said aircraft in a predetermined position, and said system including means for developing an output corresponding to said predetermined position; the combination comprising engaging means to operatively connect said automatic steering system to said surfaces, first reference means responsive to deviations of said craft from a predetermined position for developing an output corresponding to said deviation, second reference means responsive to displacement of said control surfaces from a predetermined position for developing an output corresponding to said displacement, comparing means operatively connected with said first and second reference means for developing a control effect corresponding to the difference between the maintained position of said craft and said first mentioned predetermined position, control means associated with said comparing means and said automatic steering system and responsive to said control effect for causing actuation of said engaging means into a disengaging relation so as to render said automatic steering system ineffective for controlling said surfaces, said comparing means including synchronizing means rendered operative by said control means to compensate said comparing means for the change in position of said craft while said engaging means is in said disengaging position.

References Cited in the file of this patent

UNITED STATES PATENTS

| | | |
|---|---|---|
| 2,403,658 | Hayman | July 9, 1946 |
| 2,451,263 | Webb | Oct. 12, 1948 |
| 2,466,702 | Hamby | Apr. 12, 1949 |
| 2,470,820 | Hull | May 24, 1949 |
| 2,471,821 | Kutzler | May 31, 1949 |
| 2,480,574 | Hanna et al. | Aug. 30, 1949 |
| 2,487,793 | Esval et al. | Nov. 15, 1949 |
| 2,553,560 | Esval | May 22, 1951 |
| 2,570,905 | Young et al. | Oct. 9, 1951 |
| 2,589,834 | MacCallum | Mar. 18, 1952 |
| 2,614,236 | Alberts | Oct. 14, 1952 |
| 2,634,391 | Rusler | Apr. 7, 1953 |
| 2,686,285 | Meredith et al. | Aug. 10, 1954 |